United States Patent
Hu

(10) Patent No.: US 11,500,578 B2
(45) Date of Patent: Nov. 15, 2022

(54) MEMORY ACCESS THRESHOLD BASED MEMORY MANAGEMENT

(71) Applicant: Micron Technology, Inc., Boise, ID (US)

(72) Inventor: Guang Hu, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/234,227

(22) Filed: Apr. 19, 2021

(65) Prior Publication Data

US 2022/0334754 A1 Oct. 20, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2006/0064601 A1* | 3/2006 | Stek | .................. | G06F 3/0604 |
| 2007/0033377 A1* | 2/2007 | Sinclair | ................... | G06F 3/064 |
| | | | | 711/E12.008 |
| 2011/0289260 A1* | 11/2011 | Wang | ................... | G06F 12/0246 |
| | | | | 711/E12.008 |
| 2013/0055046 A1* | 2/2013 | Blodgett | ............. | G06F 11/0793 |
| | | | | 714/764 |
| 2014/0231954 A1 | 8/2014 | Lue | | |
| 2016/0179386 A1 | 6/2016 | Zhang | | |
| 2017/0161135 A1* | 6/2017 | Yen | ........................ | G06F 3/0619 |
| 2019/0279725 A1* | 9/2019 | Shim | .................. | G11C 16/3436 |
| 2020/0097211 A1* | 3/2020 | Alsasua | ............ | G11C 16/3422 |

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Sanjiv Shah
*Assistant Examiner* — Elias Young Kim
(74) *Attorney, Agent, or Firm* — Brooks, Cameron & Huebsch, PLLC

(57) ABSTRACT

A method includes determining respective memory access counts of a plurality of blocks of non-volatile memory cells that are grouped into a plurality of respective groups, comparing the respective memory access counts to respective memory access thresholds, determining a respective memory access count of a block of non-volatile memory cells exceeds a respective memory access threshold, and performing a media scan operation on the block of non-volatile memory cells.

17 Claims, 5 Drawing Sheets

| 225-G | 223-19 | 223-20 | 223-21 | 223-22 | 223-23 | 223-P | t4 |
|---|---|---|---|---|---|---|---|
| 225-2 | 223-13 | 223-14 | 223-15 | 223-16 | 223-17 | 223-18 | t3 |
| 225-3 | 223-7 | 223-8 | 223-9 | 223-10 | 223-11 | 223-12 | t2 |
| 225-1 | 223-1 | 223-2 | 223-3 | 223-4 | 223-5 | 223-6 | t1 |

MEMORY ACCESS THRESHOLD BASED MEMORY MANAGEMENT

TECHNICAL FIELD

Embodiments of the disclosure relate generally to memory sub-systems, and more specifically, relate to memory access threshold based memory management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 illustrates an example of groups of blocks of memory cells in accordance with some embodiments of the present disclosure.

DETAILED DESCRIPTION

Figure 1:
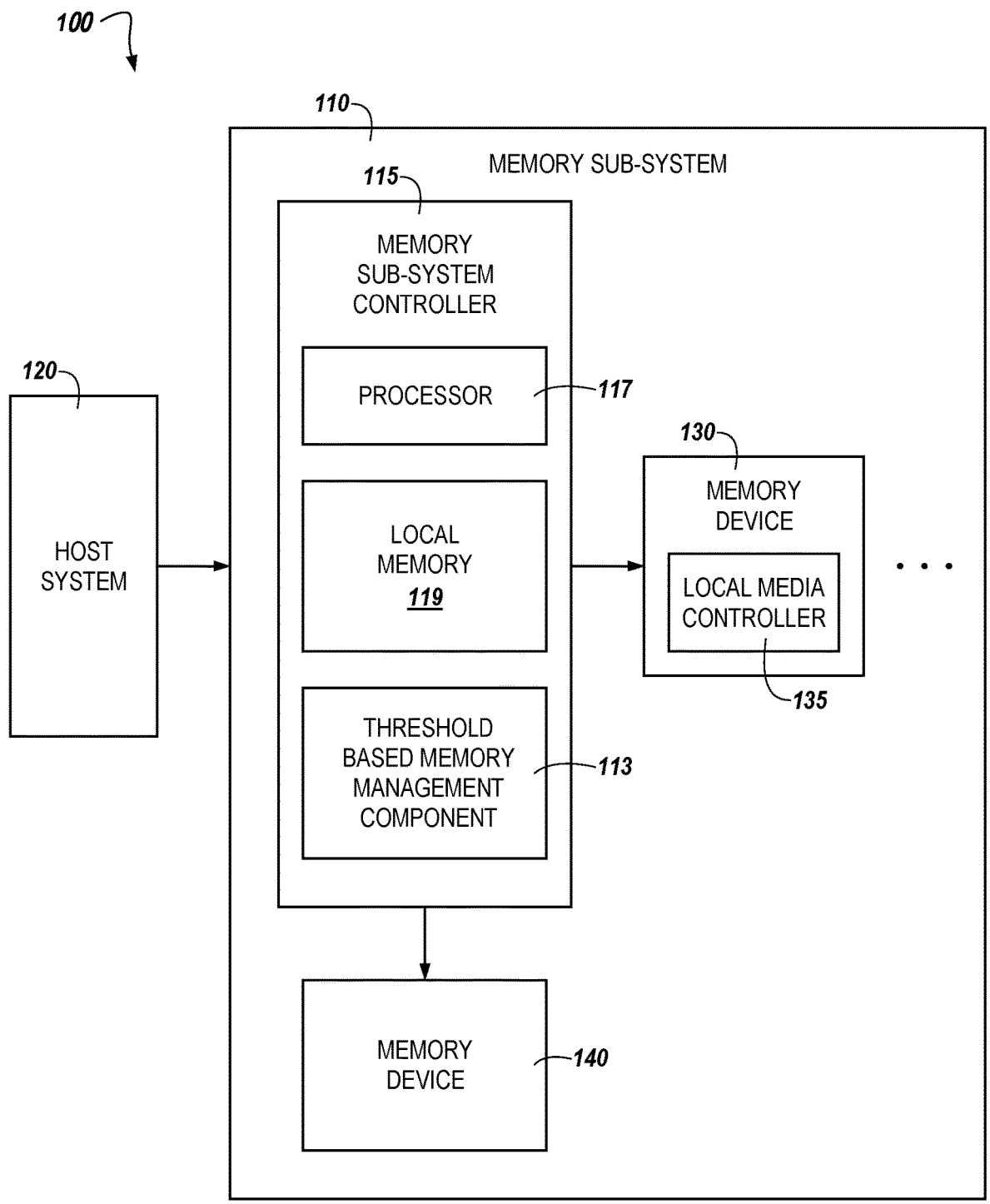
FIG. 1 illustrates an example computing system that includes a memory sub-system in accordance with some embodiments of the present disclosure.

Aspects of the present disclosure are directed to memory access threshold based memory management, in particular to memory sub-systems that include a memory access threshold based memory management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Media management operations can be performed on the memory blocks. Non-limiting examples of media management operations can include error correction operations, wear leveling operations, read disturb mitigation operations, and/or garbage collection operations. Media management operations can be performed in the "foreground" (e.g., during a time when a host is utilizing an interface associated with the memory sub-system and/or in the "background" (e.g., when the host is not utilizing the interface associated with the memory sub-system). Media management operations can be referred to in the alternative as "memory management operations", herein.

Media management operations can be performed in response to a threshold number of memory accesses (read operations and/or write operations) for a memory cell. For instance, upon a threshold number of read operations being performed on the data block, the memory sub-system can perform a data integrity check (also referred to herein as a "scan") to check for errors in data stored in the data block. During the data integrity check, one or more reliability characteristics are determined for data stored at the data block. One example of a reliability characteristic is raw bit error rate (RBER). The RBER corresponds to a number of bit errors per unit of time that the data stored at the data block experiences.

If the reliability characteristic for a data block exceeds a threshold value, indicating a high error rate associated with data stored at the data block, then the data stored at the data block can be relocated to a new data block of the memory sub-system (also referred to herein as "folding"). "Folding" is the migration of data from one memory device location (e.g., NAND location) to another memory device (e.g., NAND location) location independent of any direct host interaction. Folding the data stored at the data block to the other data block can include writing the data to the other data block to refresh the data stored by the memory sub-system. Folding can, for instance, be done to negate the effects of read disturb associated with the data.

However, performing data integrity checks can add latency to operations in a memory system. For instance, "centralized" approaches may use a common (i.e., same) threshold to trigger data integrity checks of all memory blocks in a memory system. For instance, a "centralized" approach can perform a data integrity check at a block level using a single-plane scan operation based on the common trigger. The memory sub-system can monitor the number of memory accesses performed on a particular data block and perform a single-plane scan operation when a count (e.g., a read operation count) of a memory block exceeds a threshold. The single-plane scan can be limited to reading data from a data block on only one plane of the memory component. If another data block on the same or another plane of the memory component has a memory access count that also meets or exceeds the threshold, the memory sub-system initiates a separate single- plane scan operation after the previous scan operation is complete. Performing individual scans in this manner can result in the performance of excessive memory management operations by the memory sub-system. For instance, "centralized" approaches may employ a 1:1 ratio between a total number of background media scan operations and a total number of host initiated reads. Thus, "centralized" approaches may impart a high amount of latency (e.g., a 50 percent increase in latency as compared to runtime operation when background media scan operations are not being performed) on the memory system due, at least in part, to employing the 1:1 ratio. Such latency can be undesirable, especially in critical applications and/or in applications in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures. Moreover, "centralized" approaches employing the common threshold for each block may result in several blocks, particularly near the end of an expected lifetime of a device, exceeding the common threshold at and/or near the same time and thus lead to a large drop in performance (e.g., a large drop in performance due to occurrence of a "scan storm" including a plurality of continuous or near continuous background media scan operations of several different blocks that each exceed the common threshold).

Aspects of the present disclosure address the above and other deficiencies by setting different respective memory access thresholds for each group of NAND memory blocks. In this way, some but not all of the groups of NAND memory blocks can be triggered for (and undergo) a data integrity check at a given time. For instance, each block of NAND memory blocks in a respective group can undergo a data integrity check, while other NAND memory blocks in different groups do not undergo a data integrity check. Performing a data integrity checks of some but not all groups of NAND memory blocks can improve (e.g., increase) the ratio of a total number of host-initiated reads to background media scan operations (e.g., a ratio of host-initiated read to background media scan operations is greater than 1 such as 2:1, 4:1, etc.) rather than "centralized" approaches which employ the same threshold and therefore have a 1:1 ratio of host-initiated reads to background media scan operations). Moreover, performing a data integrity check of some but not all of the NAND memory groups at a given time can therefore reduce a total number of NAND memory blocks (e.g., reduce a total number of pages) which are scanned at the given time, and thus reduce latency as compared to previous approaches. Further, setting different respective memory access thresholds for the groups of NAND memory blocks and/or varying a total number of groups of NAND memory blocks can desirably permit performing data integrity checks, and yet not exceed a permissible amount latency (e.g., 10 percent increase in latency) while performing the a data integrity checks. Thus, memory sub-system performance can be improved in comparison to approaches (e.g., centralized approaches) which do not a set a total number of groups of NAND memory blocks and/or a respective memory access thresholds of the groups of NAND memory blocks. Embodiments herein can be applied in mobile memory deployments to further improve the reliability of a memory sub-system deployed in a mobile computing architecture.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory access threshold based memory management component 113. Although not shown in FIG. 1 so as to not obfuscate the drawings, the memory access threshold based memory management component 113 can include various circuitry to facilitate determining respective memory access counts of blocks of NAND memory cells that are grouped into respective groups, determining a respective memory access count of a block of NAND memory cells exceeds a respective memory access threshold of a respective group, and performing a media scan operation on the block of NAND memory cells. For instance, a background media scan operation can be performed on the block of NAND memory cells. As used herein, "background media scan operations generally refer to media scan operations performed in the absence of performance of an I/O transaction encumbering a host such as the host system 120 illustrated in FIG. 1). In some embodiments, the memory access threshold based memory management component 113 can include special purpose circuitry in the form of an ASIC, FPGA, state machine, and/or other logic circuitry that can allow the memory access threshold based memory management component 113 to orchestrate and/or perform operations to selectively perform background media scan operation operations and/or other media management operations for the memory device 130 and/or the memory device 140 based at least on determining a respective memory access count of a block of NAND memory cells exceeds a respective memory access threshold of a respective group in which the block of NAND memory cells is grouped.

In some embodiments, the memory sub-system controller 115 includes at least a portion of the memory access threshold based memory management component 113. For example, the memory sub-system controller 115 can include a processor 117 (processing device) configured to execute instructions stored in local memory 119 for performing the operations described herein. In some embodiments, the memory access threshold based memory management component 113 is part of the memory sub-system 110, an application, or an operating system.

In a non-limiting example, an apparatus (e.g., the computing system 100) can include a memory sub-system memory access threshold based memory management component 113, which can be referred to herein as a "memory access threshold based memory management component" 113 or "threshold based memory management component" 113 for brevity. The memory access threshold based memory management component 113 can be resident on the memory sub-system 110. As used herein, the term "resident on" refers to something that is physically located on a particular component. For example, the memory access threshold based memory management component 113 being "resident on" the memory sub-system 110 refers to a condition in which the hardware circuitry that comprises the memory access threshold based memory management component 113 is physically located on the memory sub-system 110. The term "resident on" may be used interchangeably with other terms such as "deployed on" or "located on," herein.

The memory access threshold based memory management component 113 can be configured to determine respective memory access counts of memory cells (e.g., blocks of NAND memory cells) that are grouped into respective groups. For instance, a respective memory access count can be a read operation count and/or a write operation count, among other possibilities. For instance, in some embodiments, the memory access threshold based memory management component 113 can determine respective read operation counts of blocks of NAND memory cells that are grouped into respective groups. In such embodiments, the memory access threshold based memory management component 113 can determine a read access count for a block of NAND memory cells in which a physical page that has been accessed resides. For instance, the threshold based memory management component 113 can check a counter associated with the block of NAND memory cells that is to increment responsive to each memory access (e.g., read operation) of the block of NAND memory cells. Thus, the respective memory access count can be determined for an entire memory block of memory cells such as for all pages, planes, and dice of the block of memory cells (e.g., an entire superblock). However, in some embodiments, a respective memory access count can be determined for a portion of, but not all of, a block of memory cells.

As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND memory blocks can be deployed across multiple memory dice that have multiple planes and/or pages associated therewith. The terms "superblock," "block," "block of memory cells," and/or "interleaved NAND memory blocks," as well as variants thereof, can, given the context of the disclosure, be used interchangeably.

In some embodiments, the memory access threshold based memory management component 113 can be further configured to compare the respective memory access counts to respective memory access thresholds of the groups. In some embodiments, the memory access threshold based management component 113 can compare a respective read operation counts of the blocks of NAND memory cells to respective read operation thresholds of the groups, as detailed herein with respect to FIG. 2. Comparison of the respective memory access counts to respective memory access thresholds of the groups can permit determination of whether any group of the groups exceeds a respective memory access threshold of the group. For instance, the memory access threshold based memory management component 113 can be further configured to determine a respective memory access count of a block of NAND memory cells exceeds a respective read operation threshold of a respective group in which the block of NAND memory cells is grouped, as detailed herein.

In some embodiments, each group can have a different respective memory access threshold. For instance, in some embodiments, each group can have a different respective read operation threshold. As mentioned, employing different respective memory access thresholds for the groups can permit triggering media scanning of some but not all of the NAND memory groups at a given time which can reduce a total number of NAND memory blocks (e.g., a total number of pages) that are scanned over a given time period, and thus reduce latency over the given time period as compared to previous approaches such as "centralized" approaches.

The memory access threshold based memory management component 113 can be further configured to perform a media scan operation such as a background media scan operation on the block of NAND memory cells. That is, a block of NAND memory cells having a respective memory access count that exceeds a respective memory access threshold of a group in which the block of NAND memory cells is located and can be scanned to determine a reliability characteristic of the block of NAND memory cells. For instance, the memory access threshold based memory management component 113 can perform a read operation on data at the block of NAND memory cells using a number of read signals to determine a RBER of the data in the block of NAND memory cells and/or to determine a RBER of each block of NAND memory cells in the group in which the block of NAND memory cells is located.

In some embodiments, the memory access threshold based memory management component 113 can perform a background media scan operation on a group of blocks of NAND memory cells that have at least one block of NAND memory cells that has a memory access count which exceeds a memory access threshold of the group of blocks of NAND memory cells. In such embodiments, the background media scan operation is included in a plurality of background media scan operations of the blocks of NAND memory cells in the group.

In such embodiments, a ratio of a total number of host initiated memory accesses to a total number of the plurality of background media scan operations can be greater than 1:1. As mentioned, having a ratio of a total number of host initiated memory accesses to a total number of the plurality of background media scan operations that is greater than 1:1 can reduce latency associated with data integrity checks of the blocks of NAND memory cells. For instance, employing a ratio of a total number of host initiated memory accesses to a total number of the plurality of background media scan operations in a range from 2:1 to 10:1 can allow for latency to be increased by a permissible degree (e.g., 10 percent), as compared to previous approaches having higher latency (e.g., 50 percent) that can be readily perceptible to an end-user (e.g., an end user of a mobile device). All individual values and sub-ranges from 2:1 to 10:1 are included. For instance, a ratio of a total number of host initiated memory accesses to a total number of the plurality of background media scan operations can be in a range from 4:1 to 8:1, among other possibilities. Higher ratios can reduce latency but may increase an total amount of time to perform the background media scan operations. Thus, in some embodiments, higher ratios (e.g., 10:1, 8:1, etc.) may be desirable, while in other embodiments lower ratios (e.g., 4:1, 2:1, etc.) may be desirable. In this way, a reduction in latency can be tailored to an particular memory system and/or particular deployment (e.g., a mobile deployment) of the memory system, and yet data on the memory system can be efficiently scanned.

Similarly, the total number of the groups of NAND memory cells can be in a range from 2 to 10. All sub-ranges and individual values from 2 to 10 are included. In some embodiments, a total number of the different memory access thresholds can be in a range from 2 to 10. All sub-ranges and individual values from 2 to 10 are included. For instance, in some embodiments, a total number of the different respective read operation thresholds is in a range from 4 to 8 different respective read operation thresholds. In some embodiments, a total number of the groups of NAND memory cells can be equal to a total number of the different memory access thresholds, e.g., as described with respect to FIG. 2 herein. In such embodiments, each group of NAND memory cells can have a different respective memory access threshold which can reduce latency as compared to other approaches that employ the same memory access threshold (e.g., a designed system threshold) for each block of NAND memory cells.

In some embodiments, the memory access threshold based memory management component 113 can perform folding operations on the block of NAND memory cells. For example, the memory access threshold based memory management component 113 can perform a media scan operation which is part of a folding operation (e.g., which is part of a garbage collection operation) on the block of NAND memory cells. For instance, if a reliability characteristic for a data block exceeds a threshold value, indicating a high error rate associated with data stored at the data block the memory access threshold based memory management component 113 can perform folding operations on the block of NAND memory cells.

FIG. 2 illustrates an example of groups of blocks of memory cells 220 in accordance with some embodiments of the present disclosure. In some embodiments, the blocks of memory cells 220 illustrated in FIG. 2 can be superblocks (e.g., interleaved blocks of NAND memory cells deployed across multiple memory dice of a memory sub-system). In some embodiments, the blocks of memory cells 220 illustrated in FIG. 2 can include replacement-gate memory cells, although embodiments are not so limited.

As illustrated in FIG. 2, the blocks of memory cells 220 can include multiple individual groups of memory cells 225-1, 225-2, 225-3 to 225-G. For instance, the groups of memory cells can be arranged in respective block stripes as illustrated in FIG. 2. The block stripes can be page stripes and/or LUN stripes. For instance, in some embodiments, the groups of memory cells can be arranged into respective page stripes. As used herein, a "page stripe" generally refers to the logical grouping of all pages in a LUN stripe that have the same logical block and logical page number, such that they can all be accessed in parallel. However, in some embodiments, the groups of memory cells can be arranged into respective LUN stripes. As used herein, a "LUN stripe" refers a collection of planes that are treated as one when writing, reading, or erasing NAND memory.

Each of the groups 225-1 to 225-G can include blocks of non-volatile (e.g., NAND) memory cells. For instance, a first group 225-1 can include blocks of NAND memory cells 223-1, 223-2, 223-3, 223-4, 223-5, to 223-6 as illustrated in FIG. 2. Similarly, a second group 225-2 can include blocks of NAND memory cells 223-7, 223-8, 223-9, 223-10, 223-11, to 223-12, a third group 225-3 can include blocks of NAND memory cells 223-13, 223-14, 223-15, 223-16, 223-17, to 223-18, while and a fourth group 225-G can include blocks of NAND memory cells 223-19, 223-20, 223-21, 223-22, 223-23, to 223-P. While FIG. 2 illustrates total of 4 respective groups each having a total of 6 blocks of NAND memory cells, it is understood that a total number of groups and/or a total number of blocks of NAND memory cells in a group can be increased or decreased, for instance, depending on a permissible amount of latency, as detailed herein.

As mentioned, the groups 225-1 to 225-G can have respective memory access thresholds such as respective read operation thresholds. As illustrated in FIG. 2 the first group 225-1 can have a first memory access threshold (t1). Similarly, the second group 225-2, the third group 225-3, and the fourth group 225-G can have a second memory access threshold (t2), a third memory access threshold (t3), and a fourth memory access threshold (t4), respectively.

In various embodiments, each group of the groups 225-1 to 225-G can have a different respective memory access threshold. Stated differently, the respective memory access threshold of each of the groups 225-1 to 225-G can all have different values. As mentioned, having different respective memory access thresholds for each of the groups can reduce latency as compared to other approaches that employ the same threshold such as a designed system threshold (e.g., "M" quantity of read operations) and/or that trigger scanning of all blocks at the same time. As used herein, a designed system threshold is a number of memory accesses (e.g., "M" quantity of read operations) a block in a memory system is designed to undergo before data in the block is scanned. As used herein, "M" refers to a variable quantity of memory operations such as a quantity of read operations. "M" can be a predetermined and/or variable quantity of memory accesses.

In some embodiments, the respective memory access thresholds (e.g., t1, t2, t3, and t4) are different by a value that is based on a total number of pages in any one of the blocks of NAND memory cells 223-1 to 223-P. Having the respective memory access threshold be based on a total number of pages in any one of the blocks of NAND memory cells can ensure only a given number of blocks (and therefore only a given number of pages) are subject to background scan operations over a given period of time (e.g., those which exceed a respective threshold), and thereby improve latency as compared to previous approaches. For instance, each group of the groups 225-1 to 225-G can have respective read operation thresholds that are iteratively different by a fixed value that is based on a total number of pages in the block of NAND memory cells. For example, if total number of pages in a block of NAND memory cells is 2112 pages (among other possible values), t1 can be equal to "M"–(3*2112) memory accesses, t2 can be equal to "M"–(2*2112) memory accesses, t3 can be equal to "M"–2112 memory accesses, and t4 can be equal to "M" memory accesses. That is, each of the memory access thresholds of the groups can be different (e.g., increased or decreased) by different by a fixed value that is equal to the total number of pages in the block of NAND memory cells.

In some embodiments, the respective memory access thresholds can be based on a designed system threshold. For instance, the respective memory access thresholds can include at least one memory access threshold that is less than a designed system threshold. Having at least one memory access threshold that is less than the designed system threshold can trigger scanning of a group earlier (e.g., earlier than waiting until the designed system threshold is exceeded). Triggering the scanning of the group earlier can be ensure that data in the group remains valid and yet also ensures that some but not all groups are triggered at the same time. For instance, in some examples, all but one of the respective memory access thresholds are less than a designed system threshold. For example, a given a total number of pages in a block of NAND memory cells can be 2112 pages (among other possible values) and a designed system threshold can be "M" read operations (among other possible values). In such examples, t1 can be equal to "M"–(3*2112) read operations, t2 can be equal to "M"–(2*2112) read operations, t3 can be equal to "M"–2112 read operations, and t4 can be equal to "M" read operations, among other possible values. Thus, in some embodiments, a "down spread" can be applied such that respective read operation thresholds include at least one read operation threshold that is less than a designed system threshold. In this way, ensure that some but not all groups are triggered at the same time, and yet can ensure data reliability by triggering at least some of the groups prior to the designed system threshold.

However, in some embodiments, the respective memory access thresholds can include at least one memory access threshold that is greater than the designed system threshold (e.g., "M" memory accesses). For instance, t1 can be equal to "M" memory accesses, t2 can be equal to "M"+2112 memory accesses, t3 can be equal to "M"+(2*2112) memory accesses, and t4 can be equal to "M"+(3*2112) memory accesses, among other possible values. Such "up spread" of the respective threshold values, relative to the designed system threshold, can provide an enhanced reduction in latency as compared to triggering the groups earlier (e.g., via "down spread", and yet also ensures that some but not all groups are triggered at the same time.

Thus, various embodiments can employ "down spread" or "up spread" to determine respective memory access thresholds. relative to a designed system threshold. However, in some embodiments, "center spread" can be employed to vary the respective thresholds based, at least in part, on a multiple of and/or a percentage of a designed system threshold. While described in terms of "up spread", "down spread" and "center spread" the thresholds can each be given different respective values based on any of a number of mechanisms including but not limited to "up spread", "down spread", and "center spread".

In some embodiments, the respective memory access thresholds can be based on a designed system threshold and a scaling factor. A used herein, a scaling factor refers to a factor that modifies a value of a designed system threshold. A scaling factor can reduce or increase the designed system threshold. In some embodiments, the scaling factor can be determined based on real-world testing of a memory sub-system. For instance, real-world testing can determine an actual number of memory accesses (e.g., 1,200,000 read operations) a block of NAND memory cells in a memory-subsystem can undergo before scanning data on the block of NAND memory cells is needed to ensure the data remains reliable. In such instances, a designed system threshold (e.g., a given quantity of read operations) can be increased by a scaling factor (e.g., 10%, 5%, 1%) to be a value that is different than the designed system threshold. For instance, the designed system threshold be altered by a scaling factor to be equal to the real-world value or can be altered by scaling factor to be value in a range between the designed system threshold and the real-world value. In any case, altering the designed system threshold based on a scaling factor can improve function of a memory sub-system by ensure data reliability and/or improving latency associated with scanning data on the memory sub-system.

Figure 3:
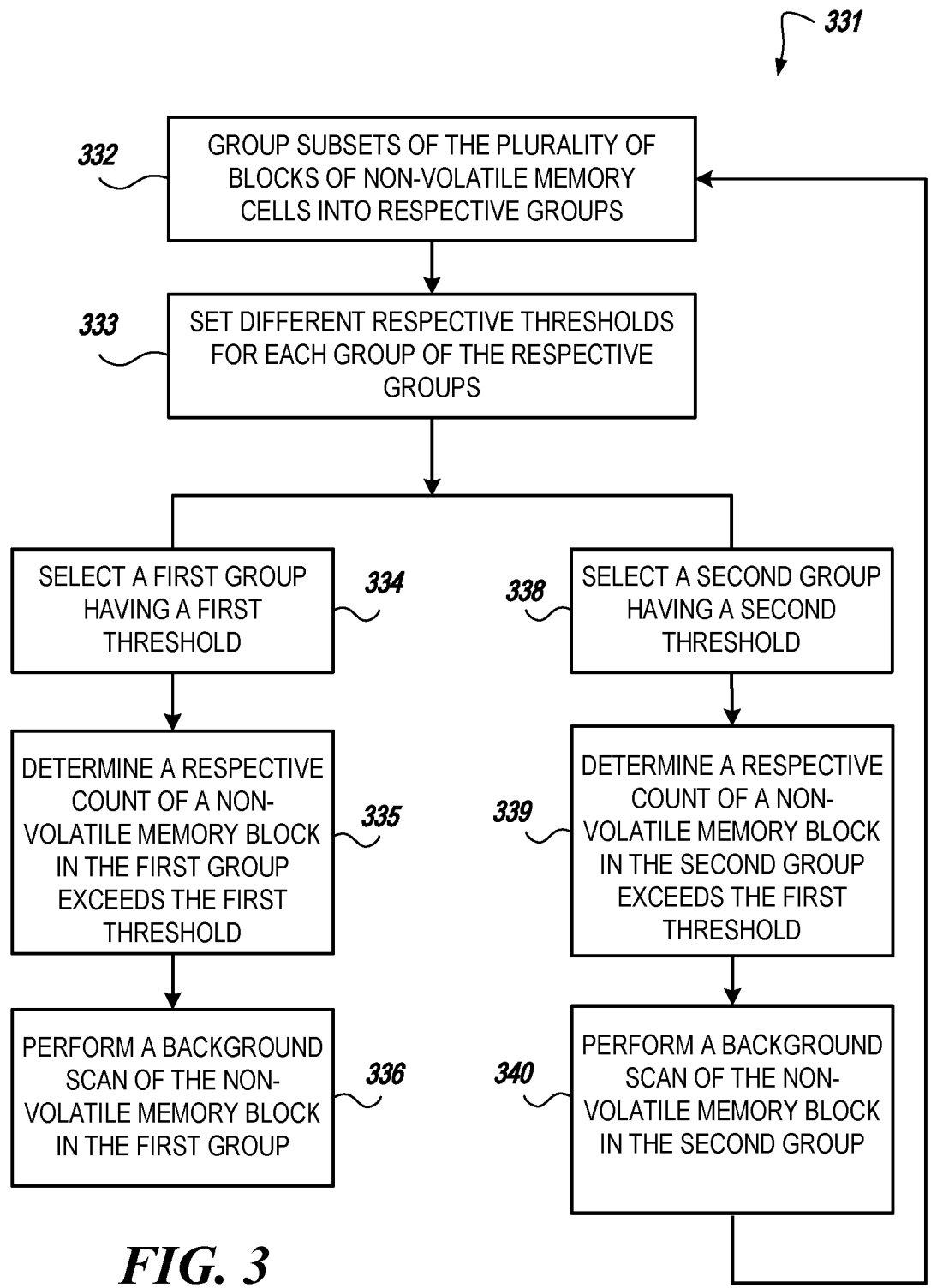
FIG. 3 is a flow diagram corresponding to memory access threshold based memory management in accordance with some embodiments of the present disclosure.

FIG. 3 is a diagram of a flow 331 corresponding to memory access threshold based memory management in accordance with some embodiments of the present disclosure. At 332, subsets of the blocks of non-volatile memory cells (e.g., NAND memory cells) can be grouped into respective groups of blocks of non-volatile memory cells. For instance, each block of non-volatile memory cells in a memory sub-system can be grouped into a respective group. As mentioned, a total number of groups can be in a range from 2 to 10 groups, in some embodiments. The total number of groups can be based on a permissible amount of latency. For instance, more groups can equal less latency, but may lead to increased computation overhead, etc. The total number of groups (and the respective thresholds) can be determined by a memory access threshold based memory management component, such as the memory access threshold based memory management component 113 illustrated in FIG. 1.

At operation 333, different respective thresholds can be set for each group. For instance, the different respective thresholds can be set using "up spread", "down spread", and/or "center spread", as detailed herein, among other possible mechanism to set the different respective thresholds.

At operation 334, a first group having a first threshold can be selected. In some embodiments, a group having a lowest memory access threshold can be selected as the first group, among other possibilities. As used herein, a "memory access threshold" such as a "read operation threshold" generally refers to a given total number of consecutive memory accesses performed on a block of memory cells in the absence of refreshing data of the block of memory cells. The first group can have a first memory access threshold such as a first read operation threshold.

At operation 335, a respective memory access count of a non-volatile memory block in the first group can be determined to exceed the first memory access threshold. In some embodiments, a respective read operation count of a non-volatile memory block in the first group can be determined to exceed a first read operation threshold. For instance, a non-volatile memory block in the first group can be determined to have a read operation count (e.g., 1,093,665 read operations) that exceeds the first read operation threshold (e.g., 1,093,664).

At operation 336, a background media scan operation can be performed on the non-volatile memory block in the first group. The background media scan operation be performed responsive to the determination that the respective memory access count of a non-volatile memory block in the first group exceeds the first memory access threshold. In some embodiments, a background media scan operation can be performed on each non-volatile memory block in the first group responsive to the determination at 335 that the memory access threshold of the first group is exceeded. Notably, performing the background media scan operation on each non-volatile memory block in the first group in the absence of performing background media scan operations on non-volatile memory blocks in other groups can reduce latency as compared to other approaches.

The flow 331 can continue for all groups and after which the flow 331 can return to 332. For instance, at operation 338 a second group having a second threshold can be selected. The second threshold is different than the first threshold. In some embodiments, the second threshold can be greater than the first threshold. However, in some embodiments, the second threshold can be less than the first threshold.

At operation 339, a respective memory access count of a non-volatile memory block in the second group can be determined to exceed the second memory access threshold. At operation 340, a background media scan operation and/or background media management operation can be performed on the non-volatile memory block in the second group.

Figure 4:
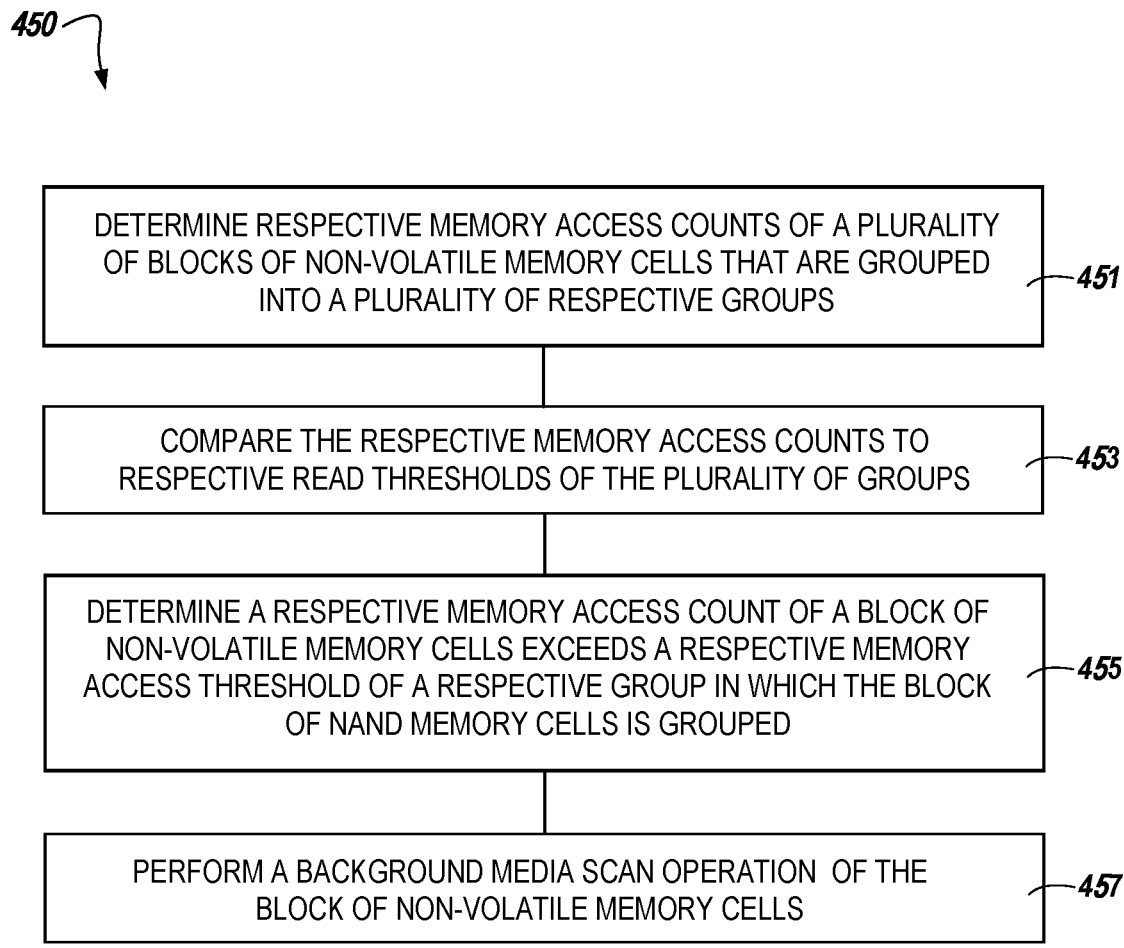
FIG. 4 is a flow diagram corresponding to a method for memory access threshold based memory management in accordance with some embodiments of the present disclosure.

FIG. 4 is flow diagram corresponding to a method 450 for memory access threshold based memory management in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the memory access threshold based memory management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 451, respective memory access counts of groups of blocks of non-volatile memory cells can be determined. The blocks of non-volatile memory cells can be blocks of memory cells such as the blocks of memory cells 220 illustrated in FIG. 2, herein. In some embodiments, the method 450 can include determining respective memory access counts of blocks of non-volatile memory cells (e.g., one or more blocks of non-volatile memory cells) in a memory sub-system. In some embodiments, the memory sub-system can be analogous to the memory sub-system 110 illustrated in FIG. 1. As described above, the memory components can be memory dice or memory packages that are coupled to one another to create an array of memory cells, such as a three-dimensional stackable cross-gridded array of memory cells used by the memory sub-system to store data.

In some embodiments, the method 450 can include determining respective memory access counts of the groups of blocks of non-volatile memory cells by obtaining a values from counters associated with the blocks on non-volatile memory cells. For instance, each block of non-volatile memory cells can have a corresponding counter than can be incremented responsive to memory access of the block of non-volatile memory cells.

At operation 453, the respective memory access counts can be compared to the respective memory access thresholds. For instance, a respective read operation count of a block of non-volatile memory cells can be compared to a respective read operation threshold of a group in which the block of non-volatile memory cells is grouped. At operation 455, a respective memory access count of a block of non-volatile memory cells can be determined to exceed the respective memory access threshold of the respective group in which the block of non-volatile memory cells is grouped.

At operation 457, a background media scan operation can be performed on the block of non-volatile memory cells. Performing the background media scan operation exclusively on the block of non-volatile memory cells in the groups and/or exclusively on all blocks of non-volatile memory cells in the group can reduce an amount of computational overhead and/or an amount of bus traffic associated with the performing the background media scan operation in comparison to other approaches such as those which employ "centralized scanning". For instance, in some embodiments the method 450 can include performance of a folding operation/media scan operation exclusively on the respective number of planes, pages, and/or memory dice grouped into a given group of non-volatile memory cells at a given time (e.g., in the absence of performing scanning/folding on other groups of non-volatile memory cells at that time).

Figure 5:
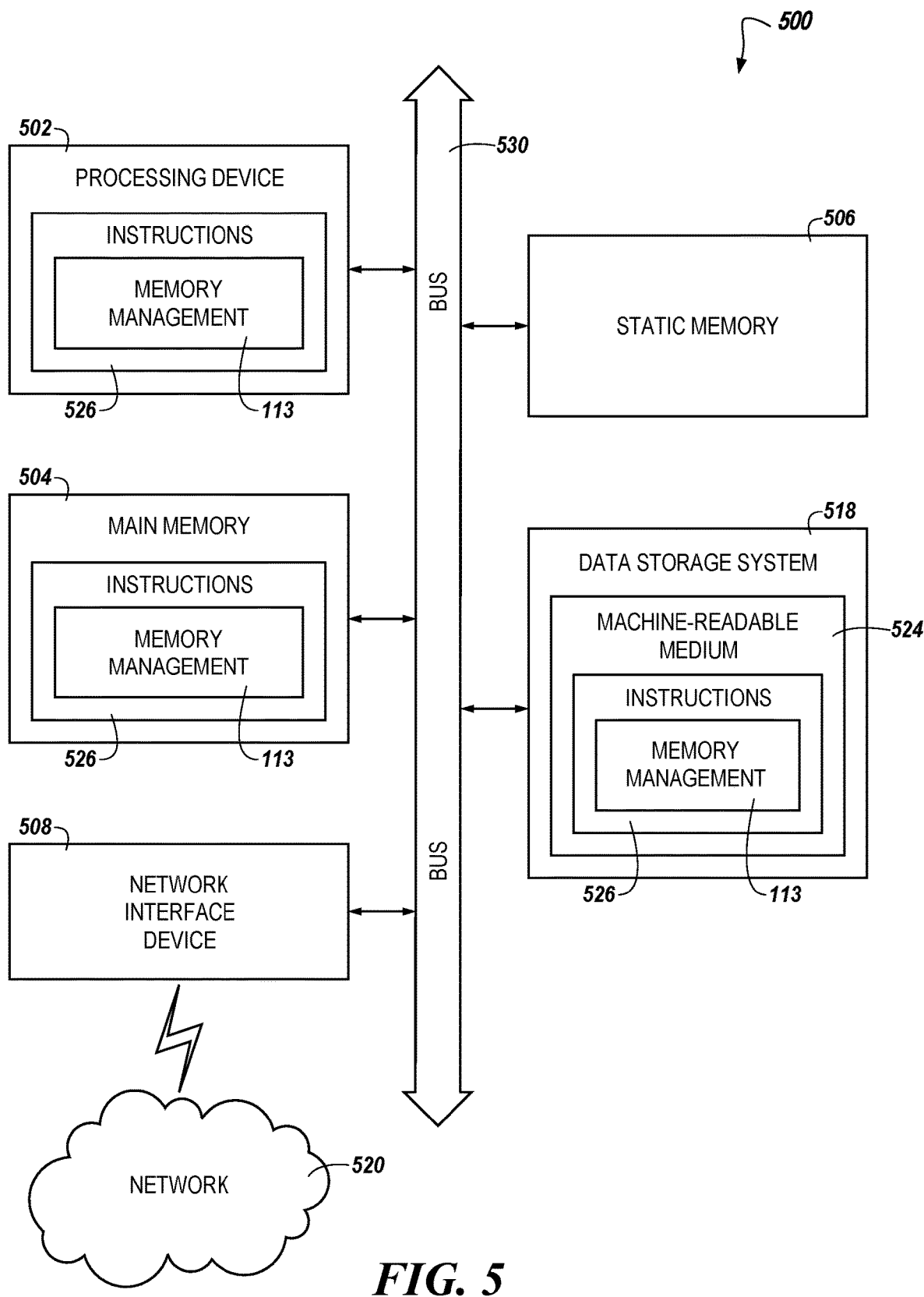
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory access threshold based memory management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a memory access threshold based memory management component (e.g., the memory access threshold based memory management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining respective memory access counts of a plurality of blocks of non-volatile memory cells that are grouped into a plurality of respective groups;
   comparing the respective memory access counts to different respective memory access thresholds of the plurality of groups, wherein each group of the plurality of respective groups has a different respective memory access threshold, and wherein the different respective memory access thresholds are each incrementally different by a fixed value that is equal to a total number of pages in a block of non-volatile memory cells in the plurality of blocks of non-volatile memory cells;
   determining a respective memory access count of a block of non-volatile memory cells exceeds a respective memory access threshold of a respective group in which the block of non-volatile memory cells is grouped; and
   performing a media scan operation on the block of non-volatile memory cells.

2. The method of claim 1, wherein a total number of the different respective memory access read operation thresholds is in a range from 2 to 10.

3. The method of claim 2, wherein the media scan operation is a background media scan operation, wherein the background media scan operation is included in a plurality of background media scan operations, and wherein a ratio of a total number of host initiated memory accesses to a total number of the plurality of background media scan operations is in a range from 2:1 to 10:1.

4. The method of claim 1, wherein a total number of the different respective memory access thresholds is in a range from 4 to 8.

5. The method of claim 1, wherein the media scan operation is a background media scan operation, and wherein performing the background media scan operation further comprises performing a read operation on data at the block of non-volatile memory cell using a number of read signals to determine a reliability characteristic of the data.

6. The method of claim 5, wherein the reliability characteristic is a raw bit error rate (RBER) of the data.

7. An apparatus, comprising:
   a memory access threshold based management component configured to:
     set different respective read operation thresholds for each group of a plurality of groups of non-volatile memory blocks of a memory component, wherein each group of the plurality of respective groups has a different respective memory access threshold, and wherein the different respective memory access thresholds are each incrementally different by a fixed value that is equal to a total number of pages in a block of non-volatile memory cells in non-volatile memory block of the memory component;
     determine respective read operation counts of the non-volatile memory blocks;
     determine a respective read operation count of a non-volatile memory block exceeds a corresponding respective read operation threshold of a group in which the non- volatile memory block is grouped; and
     responsive to the determination the respective read operation count exceeds the corresponding respective read operation threshold, perform a background media scan operation on the non-volatile memory block.

8. The apparatus of claim 7, wherein the read operation threshold management component is further configured to perform a background media scan operation on each non-volatile memory block in the group in which the non-volatile memory block is grouped responsive to the determination the respective read operation count exceeds the corresponding respective read operation threshold.

9. The apparatus of claim 7, wherein the groups of non-volatile memory blocks of the memory component are arranged in respective block stripes.

10. A system, comprising:
    a plurality of memory components arranged to form a stackable cross-gridded array of a plurality of blocks of non-volatile memory cells; and
    a processing device coupled to the plurality of memory components, the processing device to perform operations comprising:
      group subsets of the plurality of blocks of non-volatile memory cells into respective groups of blocks of non-volatile memory cells;
      set different respective read operation thresholds for each group of the respective groups of blocks of non-volatile memory cells, wherein each group of the plurality of respective groups has a different respective memory access threshold, and wherein the different respective memory access thresholds are each incrementally different by a fixed value that is equal to a total number of pages in a block of the plurality of blocks of non-volatile memory cells;
      select a first group having a first read operation threshold;
      determine a respective read operation count of a block of non-volatile memory cells in the first group exceeds the first read operation threshold; and
      perform a background media scan operation on the block of non-volatile memory cells in the first group.

11. The system of claim 10, wherein the processing device is to perform the background media scan operation on each block of non-volatile memory cells in the first group in the absence of performing background scans on blocks of non-volatile memory cells in other groups.

12. The system of claim 10, wherein, responsive to performing the background media scan operation on each block of non-volatile memory cells in the first group, the processing device is further to:

select a second group having a second read operation threshold;

determine respective read operation counts of the blocks of non-volatile memory cells in the second group;

determine a respective read operation count of a block of non-volatile memory cells in the second group exceeds the second read operation threshold; and perform a background media scan operation on each block of non-volatile cells in the second group.

13. The system of claim 12, wherein the second read operation threshold is greater than the first read operation threshold.

14. The system of claim 10, wherein the different respective read operation thresholds are based on a designed system threshold, and wherein at least one of the different respective read operation thresholds is different than the designed system threshold.

15. The system of claim 14, wherein the different respective read operation thresholds include at least one read operation threshold that is less than the designed system threshold.

16. The system of claim 14, wherein the different respective read operation thresholds include at least one read operation threshold that is greater than the designed system threshold.

17. The system of claim 14, wherein the different respective read operation thresholds are based on the designed system read threshold and a scaling factor.

* * * * *